United States Patent [19]

Gold

[11] Patent Number: 4,797,047
[45] Date of Patent: Jan. 10, 1989

[54] EXPANDABLE RETAINER

[76] Inventor: Peter Gold, 465 North Wood Rd., Rockville Centre, N.Y. 11570

[21] Appl. No.: 150,439

[22] Filed: Feb. 1, 1988

Related U.S. Application Data

[63] Continuation of Ser. No. 940,335, Dec. 11, 1986, abandoned.

[51] Int. Cl.[4] .............................................. F16B 21/00
[52] U.S. Cl. ..................................... 411/512; 411/353; 411/518; 411/901; 411/907
[58] Field of Search .............................. 411/516–518, 411/512, 522, 533, 536, 542, 544, 301–304, 901, 907, 918, 970, 947, 353; 24/155 SD, 662, 664, 681; 277/235 R, 234, 228

[56] References Cited

U.S. PATENT DOCUMENTS

| | | | |
|---|---|---|---|
| 529,831 | 11/1894 | Peckham et al. | 411/907 |
| 2,334,801 | 11/1943 | Zimmerman | 411/516 |
| 2,660,913 | 12/1953 | Frisby | 411/518 |
| 4,067,184 | 1/1978 | Johnson, Jr. | 411/901 |
| 4,630,453 | 12/1986 | Burkett | 24/664 |

FOREIGN PATENT DOCUMENTS 2255447  5/1973  Fed. Rep. of Germany ...... 411/517

Primary Examiner—Neill R. Wilson
Attorney, Agent, or Firm—Collard, Roe & Galgano

[57] ABSTRACT

A reusable retainer includes a multi-layered generally annular assembly defining a central opening formed therethrough. The assembly is composed of at least one relatively resilient layer and at least one relatively rigid layer with the said rigid layer being split to allow the assembly to radially expand or bend.

12 Claims, 6 Drawing Sheets

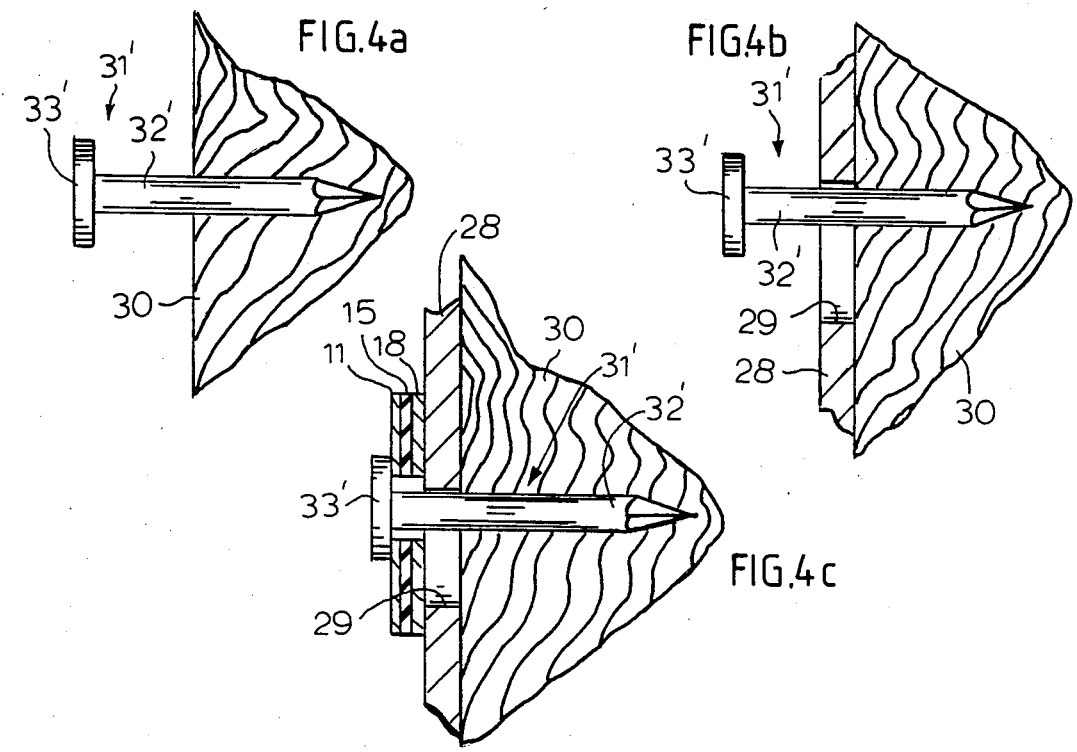
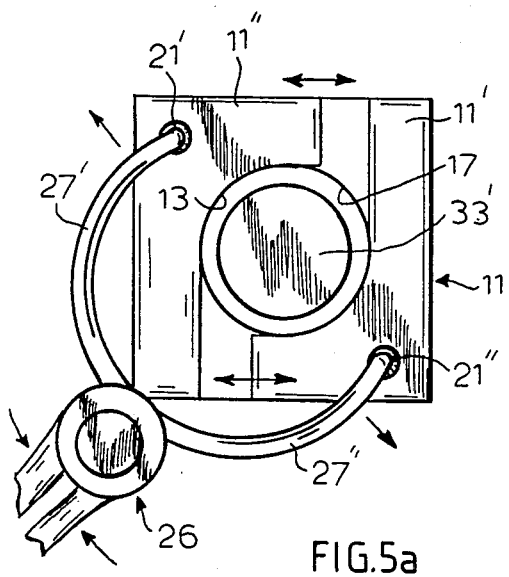
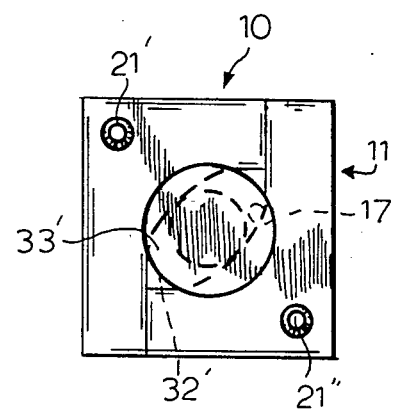
FIG.4a
FIG.4b
FIG.4c
FIG.5a
FIG.5b

EXPANDABLE RETAINER

This application is a continuation of application Ser. No. 940,335, filed Dec. 11, 1986, and now abandoned.

BACKGROUND OF THE INVENTION

The invention relates to an expandable retainer. More particularly, it relates to a reusable expandable retaining ring which may be expanded or stretched using a spanner or similar tool to install the ring over the head of a fastener whereupon on the release of the ring it reverts back to its normal shape and provides a retaining function against the head of the fastener.

In the past, a variety of washers and retaining rings have been used in a wide range of applications, with varying degrees of success. For example, U.S. Pat. No. 2,660,913 to Frisby discloses a two piece metallic retaining ring for use on shafts and the like which is expanded and installed using long round-nosed pliers inserted through holes in the outer spring coil of the ring. The conical embodiment of the Frisby retaining ring is also disclosed for resisting thrustloads while taking up end play between parts. In addition, U.S. Pat. No. 3,336,062 to Mekkes discloses a retaining ring consisting essentially of a band of non-metallic, torsionally resilient and flexible material having a generally D-shaped cross-section, for retaining e.g. two telescopically associated tubular members. The Mekkes retainer ring may be constructed either in a continuous annular form, or with one or more traverse gaps provided to avoid excessive overstressing of the ring. An alternative ring-like retainer or seal is disclosed in U.S. Pat. No. 3,134,613 to Regan which shows a quick connect shut-off device including an annular rubber collar which is slidable over and sealable against a tube end. The collar is made of an elastomeric material configured to form a fluid-tight engagement yet also designed to be readily disengageable and removable. U.S. Pat. No. 535,019, to Pipher et al is an early example of a hard washer for use on the spindles of vehicle axles and is especially intended to have high wear resistance.

Although these retaining devices may have been used in the past, each of these known devices is intended for a generally limited application. In addition, several of these known retaining rings are complicated and expensive to manufacture and can be difficult and time consuming to install and remove. Furthermore, although most known retaining rings are well suited for resisting axially applied force, they often have little resistance against torsional or bending loads.

Accordingly, it is an object of the invention to provide a novel retainer which may quickly and easily radially expand or bend to allow it to be installed over the head of a fastener or other article and then released so that it reverts to its natural shape and provides a retaining function.

It is also an object of the invention to provide such a retainer which is relatively well suited for resisting torsional and bending loads.

It is a further object of the invention to provide such a retainer which is simple in construction, inexpensive to manufacture, reliable and durable in use, and easy to install or remove.

It is a more particular object of the present invention to provide such a retainer which is generally universally adaptable to a variety of retaining applications.

SUMMARY OF THE INVENTION

Certain of the foregoing and related objects are readily achieved by the provision of a retaining ring embodying the present invention which includes a plural layered assembly defining a central opening formed therethrough composed of at least one relatively resilient layer and at least one relatively rigid layer, said rigid layer being split to allow said assembly to radially expand or bend. Preferably, the assembly is annular and multi-layered and is composed of at least one inner layer and a pair of outer layers, one of the inner layer and the pair of outer layers being split and relatively rigid and the other of the inner layer and the pair of outer layers being resilient.

In a preferred embodiment of the invention, the multi-layered assembly includes a first substantially rigid split outside layer having an opening therethrough, a second substantially rigid split outside layer having an opening therethrough, and a resilient central layer having an opening therethrough disposed inbetween the outside layers with the opening thereof generally aligned with the openings of the outer layers. Additionally, means for securing said layers together are provided to form a three-layer sandwich-like construction.

Most desirably, the split in the first layer is offset from the split in the second layer. The first and second outside layers and said central layer also advantageously have a pair of opposing mutually aligned holes such that the retainer ring may be stretched open during installation with a spanner tool having ends engageable into the holes. To facilitate this purpose, eyelet-like holding means are disposed in the pair of holes for holding the three layers together.

In a particularly preferred embodiment of the invention, the first and second outside layers and the central layer each have a generally oblong through hole. It is also desirable that the central layer be made of rubber and the first and second outside layers be made of metal. However, in a further preferred embodiment of the invention, this is reversed with the first and second outside layers being made of rubber and the central layer being a split metal ring.

In a particularly preferred embodiment, the first and second outside layers are joined by an outer wall and together define a U-shaped annular ring. Similarly, the central layer is annular and has a multiplicity of peripherally-disposed and radially-outwardly extending U-shaped barbs projecting through the outer wall of the U-shaped annular ring.

Other objects and features of the present invention will become apparent from the following detailed description when taken in connection with the accompanying drawings which disclose several embodiments of the invention. It is to be understood that the drawings are designed for the purpose of illustration only and are not intended as a definition of the limits of the invention.

BRIEF DESCRIPTION OF THE DRAWINGS

In the drawings, wherein similar reference characters denote similar elements throughout the several views:

FIGS. 4a-4c sequentially illustrate in enlarged sectional views how the retaining ring is installed and used to support an object against a support wall;

FIGS. 5a & 5b sequentially illustrate in plan view how the retaining ring is expanded so as to enable it to fit over the head of a fastener and then relaxed so as to become removably secured behind the nail head;

DETAILED DESCRIPTION OF THE PREFERRED AND ILLUSTRATED EMBODIMENTS

Figure 1:
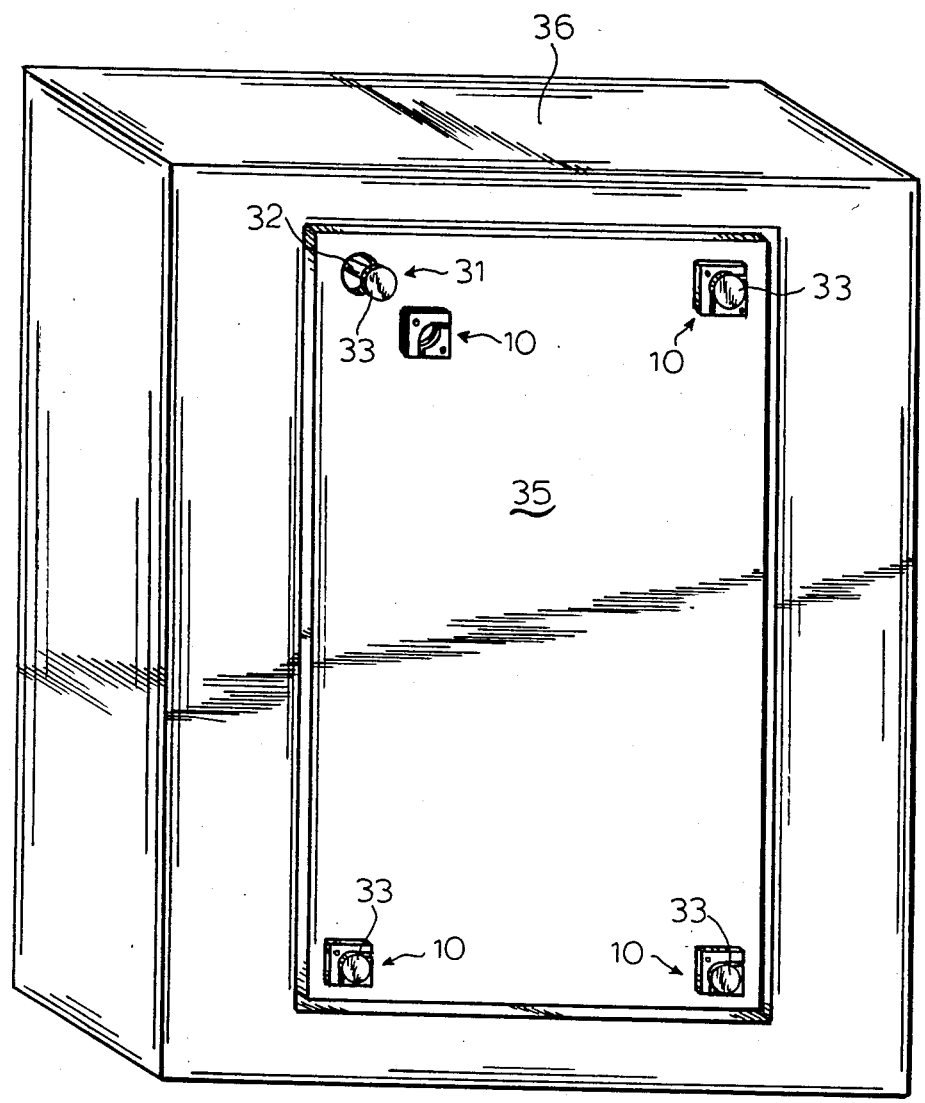
FIG. 1 is a front, top and side perspective view of an electrical junction box, the cover plate of which is disengagably secured thereto by means of retaining rings embodying the present invention.

Turning now in detail to the appended drawings, therein illustrated is a novel retaining ring embodying the present invention, generally designated by reference numeral 10, which, as shown in FIG. 1, may be used to hold a cover 35 onto a box 36 via interaction with fasteners 31 protruding from the box. Ring 10 cooperates with a fastener 31 having an enlarged head 33 over which retaining ring 1 may be installed by stretching ring 10 open so as to allow the expanded ring 10 to be passed over head 33 and released whereby it then elastically contracts or relaxes to its original shape around the fastener shank or shaft 32 and is held thereon by fastener head 33 (as described in greater detail hereinafter).

Figure 2:
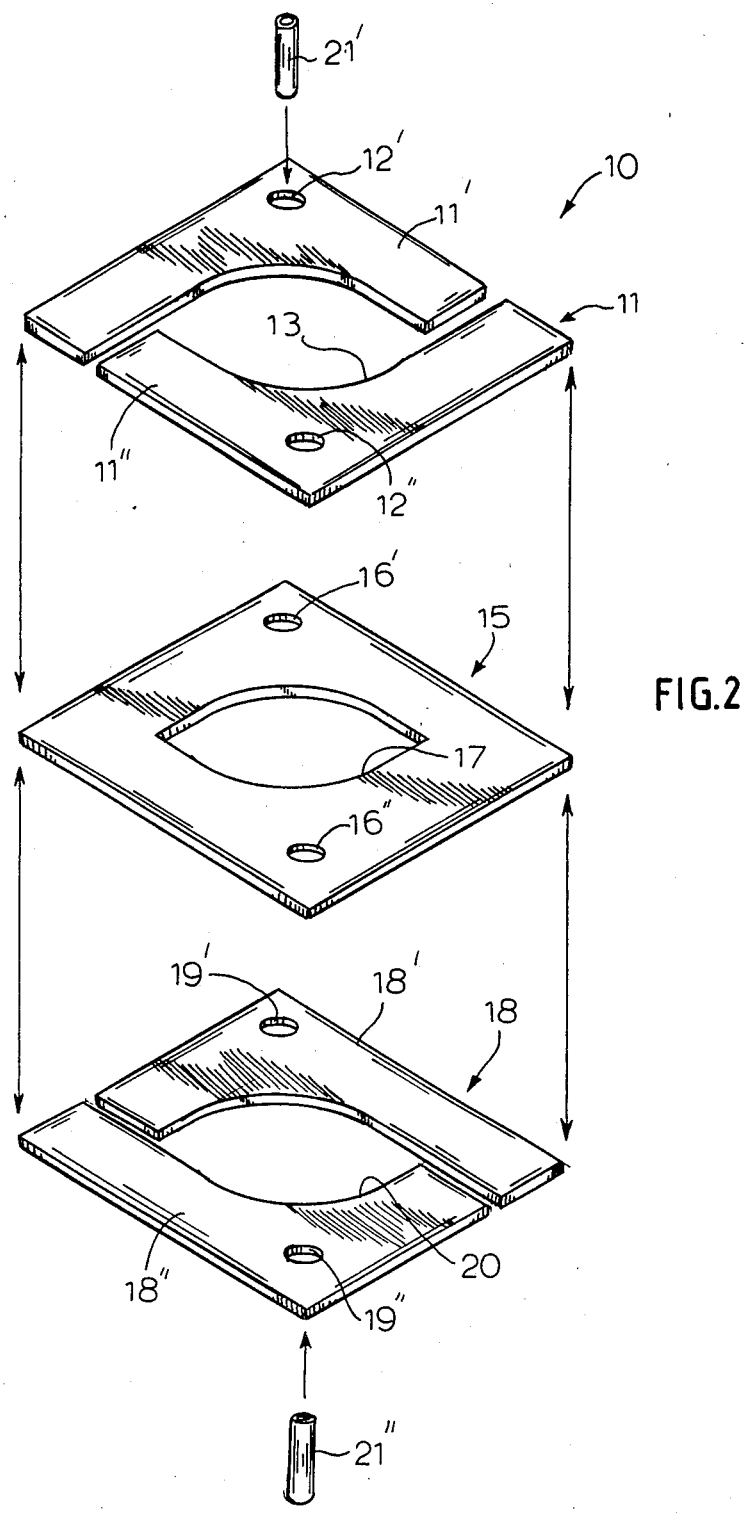
FIG. 2 is an enlarged exploded perspective view of the retaining ring.

The detailed construction of the retaining ring 10 is shown in FIG. 2 wherein a resilient central layer 15 is surrounded by or sandwiched between a first or upper rigid outer layer 11 and a second or lower rigid outer layer 18, to form a three-layered sandwich-like construction. First outer layer 11 includes two generally L-shaped plates 11' and 11" which are disposed in a coplanar arrangement facing each other. Plates 11' and 11" each have a longer leg and a shorter leg and are oriented such that the longer leg of one plate is disposed opposite to and normally to the shorter leg of the other plate, and vice versa. A pair of through holes 12' and 12" are located in plates 11' and 11", respectively, for attachment purposes. Plates 11' and 11", define therebetween a substantially oblong shaped opening 13.

Similarly, central layer 15 has a pair of through holes 6', 16" and a substantially oblong-shaped central opening 17. In addition, lower layer 18 is constructed in a manner similar to that of upper layer 11, in that it also includes two opposing, similarly oriented coplanar L-shaped plates 18' and 18". Plates cooperatively define an oblong central opening 20 therebetween.

Plates 11' and 11" of upper layer 11 may in fact be identical to each other, with upper layer 11 thereby simply comprising two identical parts facing each other. Similarly, plates 18' and 18" of lower layer 18 may also be identical to each other, as well as being identical to plates 11' and 11" of upper layer 11. Therefore, upper layer 11 and lower layer 18 may be formed simply by arranging four identical parts. However, although upper layer 11 and lower layer 18 may be formed from four identical plates, the arrangement of these plates in layers 11 and 18 are different from each other.

In particular, as shown in FIG. 2, lower layer 18 is similar to upper layer 11, except for the fact that it is a reverse mirror image, or "flipped" counterpart of upper layer 11. The rectilinear channel-like space or gap between the legs of plates 11' and 11", and 18' and 18" are at right angles with respect to the gaps of the other plates. With this arrangement, the entire retainer structure remains relatively stiff and is not easily bendable about any common axis, yet the retainer may be easily expanded for installation or removal (as discussed hereinafter).

Figure 3:
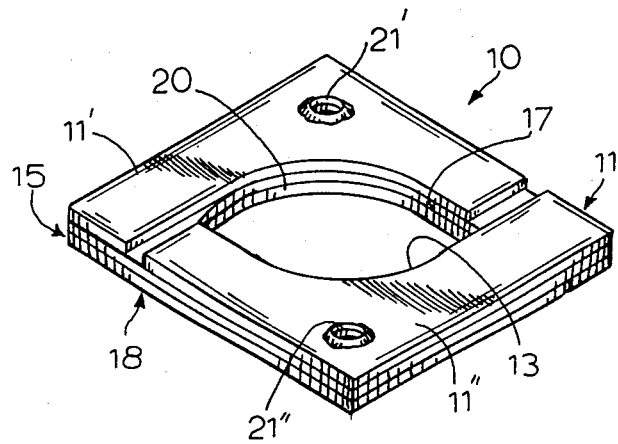
FIG. 3 is an enlarged perspective view of the retaining ring.

Central layer 15 preferably comprises a single plate made of a resilient elastomeric material, such as rubber, which may be easily stretched in its plane, whereas the plates which make up layers 11 and 18 are of a substantially rigid material such as metal or hard plastic. The three layers 11, 15, and 18 are held together into a three-layer sandwich via rivets, eyelets, ferules or the like 21', 21" which pass through mounting holes 12', 12" in ( layer 11, holes 16, 16" in layer 15, and holes 19, 19" in layer 18, respectively, which holes are substantially in mutual alignment. The oblong openings 13, 17, and 20, in each of layers 11, 15, and 18, respectively, are also generally in alignment with each other upon the fastening together of the three layers, as seen best in FIG. 3. Such fastening of the three sandwich plies could also be easily effected by joining the three plies together via a stamping operation to effect a mechanical interlocking of the three plies or possibly by adhesively bonding the plies together.

The retaining ring of the invention in operation, is intended to be used in conjunction with a fastener 31 or nail 31' or the like which would normally be used to permanently affix a sign 28, plate, painting, etc. to a wall or other support 30. As shown in the sequence of FIGS. 4a-4c, the nail or fastener 31' would be partially driven into the support wall 30 so as to leave a certain space between the nail head 33' and the wall 30 (FIG. 4a). The sign, cover, painting, or other item 28 to be held in place is provided with a bore 29 with a diameter which would be larger than the nail head 33' so that it could be simply placed over the nail head 33' after the nail or fastener 31' is installed (FIG. 4b).

As shown best in FIG. 5a, the retaining ring 10 is then stretched apart (as a result of its resilient or rubber central layer 15, and the split outer metal or plastic layers 11, 18) by means of a spanner tool 26 having a pair of arms 27', 27", the tips of which are inserted through the bores of ferules 21', 21", so that the ring can be fitted over the fastener head 33, and pressed against the sign 28 or object to be held in place (FIG. 4c). The oblong central opening of the retaining ring has a major access oriented at right angles with respect to the direction in which the spanner-like tool stretches the retaining ring open. Therefore, when ring 10 is stretched during installation, the oblong opening is formed into a substantially circular opening (FIG. 5a), so that the amount of clearance required between the opening in the retaining ring and the head of the fastener is minimized. As shown more clearly in FIGS. 2 and 3, in its relaxed state, the central opening 17 is normally too small for head 33' of fastener 31' to pass through. Once in place, the retaining ring 10 is released from the arms 27', 27" of the spanner tool 26, and due to the elasticity of the central layer 15, the retainer ring contracts about the shank 32' of the nail or fastener 31' (FIG. 5b). The sign or object is held in place by the retainer ring 10 which is biased between the nail head 33' and the sign 28 (FIG. 4c).

If there is any clearance between the nail head 33' and ring 10, the nail 31' can be simply hammered into the support wall 30 to ensure contact and firm gripping of the sign 28. To remove the sign 28 or object, the installation process is reversed, with the retaining ring 10 being expanded and pulled back over the fastener head 33' by means of the spanner tool 26, to release the sign or object 28.

Figure 6:
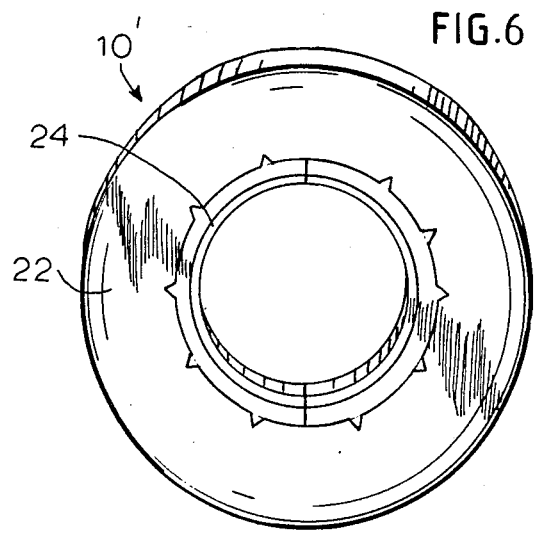
FIG. 6 is an enlarged perspective view of a second embodiment of the invention for holding a light bulb into a socket.

The retaining ring of the present invention can be modified and adapted to suit numerous retainer applications. FIGS. 6-10 illustrate one such possible application. In particular, the retaining ring of the invention may be used for holding a light bulb in a socket. As shown in FIG. 6, the retaining ring 10' may be in the form of an annular ring. However, in contrast to the previously described embodiment, for this holding application, ring 10' has a first or upper layer 22 and a second or lower layer 23 both of which are made of a resilient material such as rubber and are joined at their outer periphery 25 to substantially encase a central layer 24 made of a substantially rigid material such as metal. In addition, the central rigid layer 24 is diametrically split in half.

Figure 7:
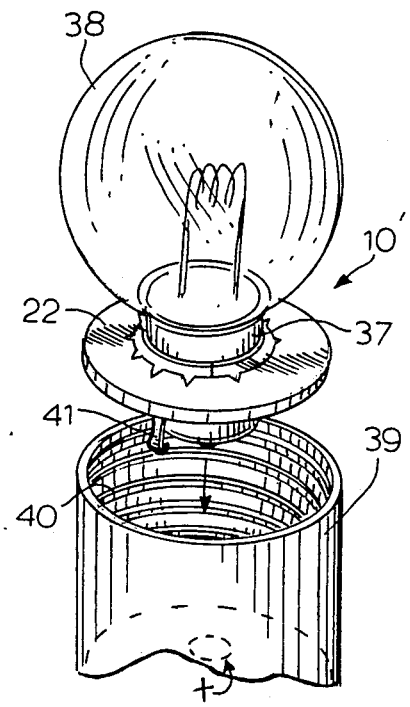
FIG. 7 is a perspective view of the retaining ring of FIG. 6 detachably secured to a light bulb being inserted into a conventional socket.

As shown in FIG. 7, the retaining ring 10' may be pushed onto the non-threaded base 37 of a modified conventional light bulb 38 with the split inner metal ring 24 flexing downwardly sufficiently to allow the ring 10' to be guided slightly more than midway up the base 37 until it mates with an annular groove or channel 42 formed therein (FIG. 8) at which time it reverts to its non-flexed state as shown in FIG. 7. Bulb 38 may then be pushed into a conventional socket or holder 39 with the outer periphery of ring 10 engaging the threaded inside wall 40 of a socket 39 (this being allowed by the upward flexing of ring 10' and, in particular, split metal ring 24). The elastic or resilient material of upper layer 22 and lower layer 23 engages and seals against inside wall 40, and similarly, layers 22 and 23 also abut against light bulb base 37, so that the bulb 38 may be installed into a socket 39 in a sealed manner, thereby preventing any water, e.g. rain, or debris from entering into socket 39. This modified arrangement would be particularly suited for outside lighting.

Figure 8:
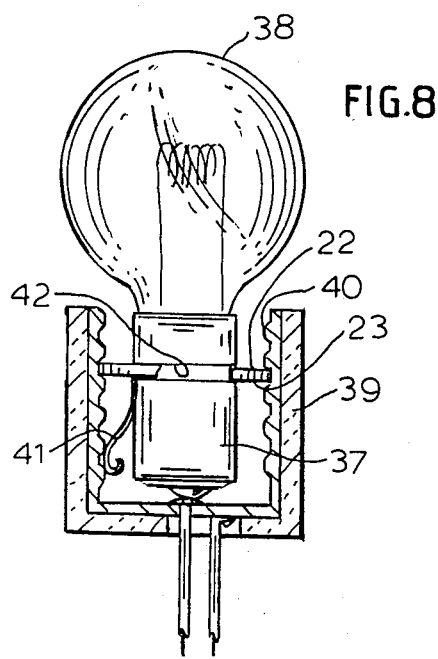
FIG. 8 is a cross-sectional view, in part elevation, showing the retaining ring-equipped light bulb installed within the socket, with a portion of the light bulb base broken away to expose an annular channel.

The center electrical contact for the bulb may be linked to a contact in socket 39 in a conventional manner. In addition, a spring-like contact 41 connected to layer 24 may be used to connect base 37 to the inner wall 40 of socket 39, in order to complete the light bulb circuit (FIG. 8). By the use of this ring, the threaded engagement of the bulb and socket could be conveniently eliminated. This would also be particularly suitable for hard-to-reach light bulb sockets such as found in ceilings.

Figure 9:
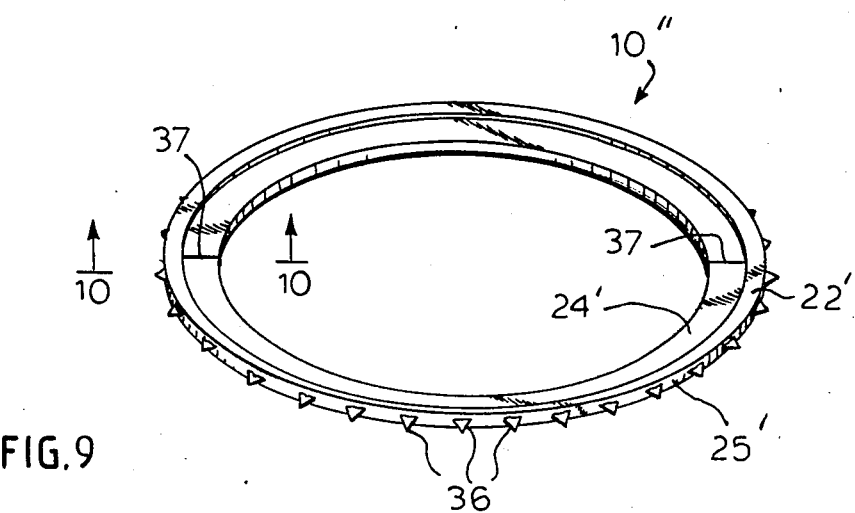
FIG. 9 is a perspective view of a further embodiment of the invention, also suitable as a light bulb retaining ring.
Figure 10:
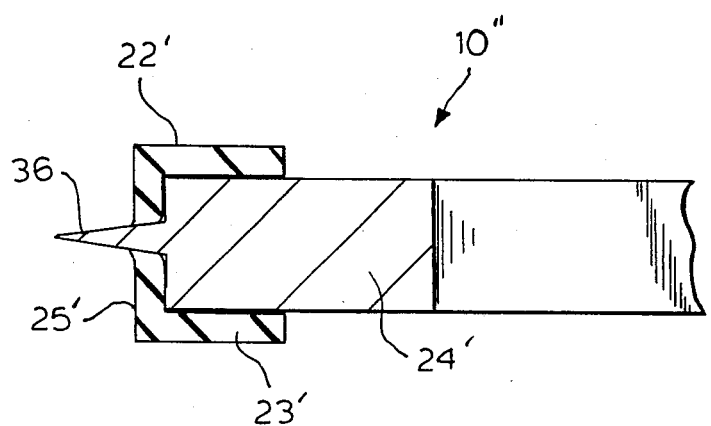
FIG. 10 is an enlarged sectional view taken along line 10—10 of FIG. 9.

FIGS. 9 and 10 illustrate a further embodiment of the retainer ring 10" also intended for holding a lightbulb in a socket but which can be used with both a conventional light bulb and socket. In this embodiment, a metallic or otherwise electrically conducting inner ring 24' having peripherally-disposed barbs or serrated tips 36 is inserted into a generally U-shaped channel of a resilient outer ring (preferably rubber or plastic) comprised of a top layer 22', bottom layer 23' and an interconnecting outer layer 25'. The dimensions and physical properties of the inner and outer ring are chosen so that the serrated periphery of the inner ring 24' cuts through the outer layer 25' of the U-shaped channel of the outer ring so that the barbs 36 ends thereof project radially outwardly beyond the outer ring. Following complete insertion of the inner ring in the outer ring, the inner ring is split in half by repeated up-and-down bending of the ring about a pair of score or cut lines 37 provided in inner ring 24'. The splitting of the inner ring 24' allows the retaining ring 10" to flex upon insertion onto the threaded base of an electrical light bulb. The retaining ring-equipped light bulb may then be inserted into the threaded socket of a conventional light bulb socket (not shown) until it contacts the electrical spring contact in the bottom thereof whereupon the barbs 36 of the retaining ring 10" engage between the threads of the socket to hold the light bulb in place and, at the same time, effect an electrical connection between the light bulb base and the threaded wall of the socket (not shown), thereby eliminating the need for an additional contact 41 as in the embodiment shown. Upon sufficient mannual force, the light bulb can easily be removed as the retaining ring will flex to allow its disengagement from the socket threads.

It should also be apparent that other variations may be made as will be apparent to those skilled in the art. For example, although embodiments having square and round outside shapes have been shown and described, it would also be possible to use other shapes both irregular and regular such as a hexagonal shape, or some other shape or design of the ring which provides an aesthetic appearance. It would also be possible to encapsulate the retainer with an elastomer such as rubber. For example, the embodiment of FIG. 6 could be modified so that the rigid split central layer is entirely encased or encapsulated. In addition, the configuration and openings in the various layers as well as their number and arrangement may be modified to suit a particular application, so long as the functional interrelationships therebetween are not impaired.

For example, the retainer ring may be provided with a rectangular outer configuration and a rectangular-shaped opening. Such an embodiment might be suitable and adaptable as a light switch cover plate.

Furthermore, the retainer need not necessarily be ring shaped. It could, for example, consist of a flat, multi-layered circular assembly composed of a central rubber layer with a small central opening and two outer circular metal layers split in an offset manner each composed of two semicircles or major and minor arcs also defining a small central opening. Such an embodiment might be particularly suitable as an electrical wire connector.

Moreover, the retaining ring of the invention may be adapted for use in a very wide assortment of applications wherein it is desirable to have a secure yet removable retainer. For example, the retaining ring of the invention could be used to hold a cloth or canvas cover over a vehicle top or body, for holding a license plate or rear view mirror onto a vehicle, for mounting frequently changed signs onto sign posts, or attaching gutters and downspouts to a building, or for any of the other widely known applications where a releasable attachment of a fastener or retainer is desirable.

In fact, it may alternatively be desired, to adapt the retainer for permanent installation, such as by the use solder, adhesive, welding, etc., after its initial installation, so as to make the retained article non-removable.

Thus, while only several embodiments of the present invention have been shown and described, it will be obvious that many changes and modifications may be made thereunto, without departing from the spirit and scope of the invention.

What is claimed is:

1. A retainer comprising:
    a plural-layered assembly defining a generally oblong central opening formed therethrough composed of at least one relatively resilient layer and at least one relatively rigid layer, said rigid layer being split to allow said assembly to radially expand or bend thereby temporarily elongating the minor axis of said generally oblong central opening in said resilient layer to permit insertion of a post therein and to capture said post upon contraction of said minor axis.

2. The retainer of claim 1 wherein said assembly is generally annular in shape, multi-layered and composed of at least one inner layer and a pair of outer layers, one of said inner layer and said pair of outer layers being split and relatively rigid and the other of said inner layer and said pair of outer layers being resilient.

3. The retainer of claim 2 wherein said multi-layered assembly comprises:
    a first substantially rigid split outside layer having an opening therethrough;
    a second substantially rigid split outside layer having an opening therethrough;
    a resilient central layer having an opening therethrough disposed inbetween said outside layers with said opening thereof generally aligned with said openings of said outer layers; and
    means for securing said layers together to form a three-layer sandwich-like construction.

4. The retainer of claim 3, wherein said split in said first layer is angularly offset from said splint said second layer with respect to the axis of said aligned opening.

5. The retainer of claim 4, wherein said first and second outside layers and said central layer have a pair of opposing mutually aligned holes such that said retainer ring may be stretched open during installation with a spanner tool having ends engageable into said holes.

6. The retainer of claim 5, wherein eyelet-like holding means are disposed in said pair of holes for holding said three layers together.

7. The retainer of claim 3, wherein said first and second outside layers and said central layer each have a generally oblong through hole.

8. The retainer of claim 3, wherein said central layer is made of rubber.

9. The retainer of claim 3, wherein said first and second outside layers are made of metal.

10. A retainer comprising:
    a plural-layered assembly defining a central opening formed therethrough, said assembly is generally annular in shape, and having a first substantially rigid split outer layer having an opening therethrough;
    a second substantially rigid split outside layer having an opening therethrough;
    a resilient central layer having an opening therethrough disposed in between said outer layers with said opening thereof generally axially aligned with said openings of said outer layers;
    means for securing said layers together to form a three layer sandwich-like construction; and
    said split in said first layer is angularly offset from said split in said second layer with respect to said axis of said aligned openings.

11. The retainer of claim 10, wherein said first and second outside layers and said central layer have a pair of mutually aligned holes such that said retainer ring may be stretched open during installation with a spanner tool having ends engageable into said holes.

12. The retainer of claim 11, wherein eyelet-like holding means are disposed in said pair of holes for holding said three layers together.

* * * * *